Patented Feb. 11, 1947

2,415,438

UNITED STATES PATENT OFFICE 2,415,438

POLYMERIZATION OF ISOBUTYLENE

Joseph B. McKinley, Pittsburgh, and Donald R. Stevens, Wilkinsburg, Pa., assignors to Gulf Research & Development Company, Pittsburgh, Pa., a corporation of Delaware No Drawing. Application December 29, 1944, Serial No. 570,475

9 Claims. (Cl. 260—666)

The present invention relates to the polymerization of isobutylene, and it is particularly concerned with a process for the production of 1,1,3-trimethylcyclopentane by the thermal polymerization of isobutylene.

Various methods of polymerizing isobutylene have heretofore been proposed in which the products obtained are usually higher acyclic polymers. Such processes include both catalytic and thermal processes. However, in these processes, relatively low temperatures and pressures have been used and it has not heretofore been found possible to produce specific cyclic polymers by such methods.

It is an object achieved by this invention to provide a process for the production of a cyclic dimer of isobutylene. It is more particularly an object achieved by this invention to provide a process for the production of 1,1,3-trimethylcyclopentane by the thermal polymerization of isobutylene.

We have found that when isobutylene is subjected to thermal treatment at temperatures above about 400° C. at pressures of about 300 to 5000 pounds per square inch for a time depending upon the other conditions employed, which may vary from several minutes to a few hours, polymerization products containing substantial proportions of 1,1,3-trimethylcyclopentane can be produced; and that by subsequently separating the olefins and paraffins from the polymerization products, a substantially pure 1,1,3-trimethylcyclopentane product can be obtained.

In carrying out the process of this invention, we have found that temperatures of about 400° to 600° C. are required for the production of substantial amounts of 1,1,3-trimethylcyclopentane, and we have found it most advantageous to effect the cyclic polymerization of isobutylene at temperatures in the range of 425° to 525° C. Within this range of temperatures, substantial proportions of 1,1,3-trimethylcyclopentane are obtained in the cyclomerization (cyclic polymerization) products, even when relatively low pressures above about 300 pounds per square inch are used.

The most desirable pressures for the operation of the process of our invention vary depending upon the type of process to be used. With pressures in the range of 400 to 900 pounds per square inch, higher ultimate yields of 1,1,3-trimethylcyclopentane are obtained than at higher pressures. For this reason, pressures within this range recommend themselves for use in continuous processes. On the other hand, best yields per pass are obtained at pressures above 1100 pounds per square inch, and when operating a batch process, pressures within this higher range are found most advantageous.

We have found it advantageous also to carry out the polymerization of isobutylene in the presence of an inert diluent, such as, nitrogen, steam, methane, carbon dioxide, flue gas or the like. At any given pressure, the diluent tends to decrease the number of contacts of olefin molecules which decreases the rate of reaction, and at the same time, the diluent absorbs part of the heat of the reaction, which is exothermic. The diluent thus constitutes a means of controlling the polymerization, which is particularly important in a continuous system using short contact times, and at the same time effectively removes considerable of the heat released.

In carrying out the process of our invention, we have found it most advantageous to effect polymerization of isobutylene in a substantially pure state, except for the presence of inert diluents as mentioned above. However, on occasion, mixtures of $C_4$ hydrocarbons such as a $C_4$ cut of cracking gases, may be used. In the latter case, however, some difficulty is encountered in the recovery of pure 1,1,3-trimethylcyclopentane from the products of the reaction. Also, some loss of isobutylene may be encountered as a result of cross-polymerization.

Subsequent to the formation of the polymerization products, as above described, the 1,1,3-trimethylcyclopentane may be isolated therefrom by various means, including particularly reacting out the olefins and unsaturated materials present and fractionation of the products to obtain a fraction boiling within about 0.2 of a degree of 105° C., the boiling point of 1,1,3-trimethylcyclopentane. One method which we have found particularly satisfactory is to first weather the reaction products by heating at a temperature of about 50° C. to remove gases and light hydrocarbons, fractionating the weathered product to isolate a fraction boiling between about 95° and 128° C. For this purpose, a fractionating column equivalent to about 15 to 16 plates, while maintaining a reflux ratio of 20:1, has proved satisfactory. The fraction boiling between 95° and 128° C. may then be refractionated to separate out a cut boiling between about 100° to 110° C. This cut may then be treated with sulfuric acid for polymerization of the olefins with subsequent separation of the polymers, or with thioglycolic acid and propionic acid followed by washing with caustic soda solution to remove the olefins and other unsaturated products. The olefin-free product thus obtained contains a cyclic dimer and some paraffinic hydrocarbons. This product may be refractionated to separate out the cyclic dimer from the paraffins. The fraction boiling between about 104.8° and 105.2° C. may be collected. This fraction usually contains at least about 80 per cent of the cyclic dimer product originally contained in the crude polymerization products. This method may be modified by hydrogenating the fraction boiling between 100° and 110° C. to effect saturation of the olefins and other unsaturates present, and subsequently fractionating the hydrogenated products to separate out the 1,1,3-trimethylcyclopentane.

Following are illustrative examples which typify presently-preferred embodiments of the invention.

EXAMPLE I 321 grams of isobutylene were transferred into a high-pressure bomb having a capacity of 1715 cc. Heat was applied until a temperature of 400° C. was reached, this temperature being maintained for one hour. The pressure rose to 2050 pounds per square inch and fell to 1080 pounds per square inch at the end of the hour. The bomb was then cooled quickly by applying an air blast.

After the bomb had cooled, it was placed in a thermostatically controlled oven at 50° C. The reaction gases were released slowly through a carbon dioxide-acetone trap and then through a liquid nitrogen trap. A gasometer filled with saturated salt water collected only a negligible amount of non-condensable gases. The liquid contents of the bomb were placed in a fractionating still with the condenser water being held at 4° C. On application of heat a small amount of gas was evolved, which was passed through the above carbon dioxide-acetone and liquid nitrogen system.

The total gas condensed was found to weigh 128.0 grams. It analyzed as follows:

|  | Mole Per cent | Wt. Per cent |
|---|---|---|
| Methy | Trace | Trace |
| Prop. | 0.5 | 0.4 |
| Propa. | 3.9 | 3.1 |
| Isobutylene | 91.0 | 91.2 |
| Isobutane | 2.6 | 2.7 |
| $C_{4}$ unsaturates | 1.8 | 2.3 |
| $C_{5}$ unsaturates | 0.2 | 0.3 |

The weathered liquid product (243.2 cc.—185 grams) was fractionated through a column equivalent to 16 plates, while maintaining a 20:1 reflux ratio. The fraction collected between 95° and 128° C. was taken as the crude dimer fraction. Analysis showed that this crude dimer fraction contained 65.0 parts by weight of the cyclic dimer, 1,1,3-trimethylcyclopentane.

Similar runs were carried out at 430° C. and 2025 pounds per square inch for a period of 1 hour, at 460–465° C. and 2025 pounds per square inch for a period of 1 hour, and at 365–370° C. and 2120 pounds per square inch for a period of 2 hours. Results are tabulated in the following table:

Table I

| Run No | 1 | 2 | 3 | 4 |
|---|---|---|---|---|
| Temperature, °C | 400 | 430 | 460–465 | 365–370 |
| Time, hours | 1 | 1 | 1 | 2 |
| Pressure, lbs./sq. in.[1] | 2,050 | 2,025 | 2,025 | 2,120 |
| Yield:[2] | | | | |
| Total liquid product, per cent[3] | 57.7 | 72.9 | 51.7 | 34.2 |
| Crude dimer (95–128°), per cent | 23.6 | 33.4 | 21.7 | 11.0 |
| Cyclic dimer, per cent | 15.3 | 23.4 | 16.1 | 6.0 |
| Coke, per cent | 0 | Trace | 4.7 | 0 |
| Liquid product: | | | | |
| Crude dimer, per cent | 40.9 | 45.9 | 42.0 | 32.2 |
| Cyclic dimer, per cent | 26.6 | 32.1 | 31.0 | 17.4 |
| Crude dimer (95–128°): | | | | |
| Sp. gr. 20°/4° C | 0.7389 | 0.7420 | 0.7532 | 0.7356 |
| Refractive index, $n_D^{20}$ | 1.4101 | 1.4107 | 1.4162 | 1.4100 |
| Bromine number | 38.0 | 30.0 | 35.0 | 55.0 |
| Paraffins, per cent | 8.0 | 9.0 | 2.0 | 7.0 |
| Unsaturateds, per cent | 27.0 | 21.0 | 24.0 | 39.0 |
| Cyclic dimer, per cent | 65.0 | 70.0 | 74.0 | 54.0 |

[1] Reaction pressures shown in this and following tabulations are maximum pressures attained in the bomb at the start of the reaction; as the run proceeded, the pressure always decreased.
[2] Yields shown in this and following tabulations are based on isobutylene charged, unless otherwise indicated.
[3] Unless otherwise indicated, percentages in this and following tabulations are percentages by weight.

EXAMPLE II

Runs similar to those of Example I were also carried out at 400° C. and 540 pounds per square inch, 400° C. and 1280 pounds per square inch, and 400° C. and 5350 pounds per square inch, the run in each case being for a period of 1 hour.

Results are tabulated in the following table:

Table II

| Pressure, lbs./sq. in | 540 | 1,280 | 5,350 |
|---|---|---|---|
| Yield: | | | |
| Total liquid product, per cent | 22.5 | 42.9 | 80.8 |
| Crude dimer (95–128° C.), per cent | 15.1 | 22.3 | 22.6 |
| Cyclic dimer, per cent | 10.3 | 14.5 | 14.5 |
| Liquid product: | | | |
| Crude dimer (95–128° C.), per cent | 67.1 | 52.0 | 28.0 |
| Cyclic dimer, per cent | 45.9 | 33.8 | 17.9 |

It will be observed from these results that at a pressure of 540 pounds per square inch the total liquid product obtained was less than that obtained at higher pressure, but that the percentage of cyclic dimer present in the total liquid product was substantially higher than was obtained at higher pressure. These results indicate that under some conditions, particularly in continuous operation, lower pressures may be more advantageous.

EXAMPLE III

The following table sets forth the results of two runs made under similar conditions of temperature and pressure but at different times:

Table III

| Time, hours | 0.5 | 4.0 |
|---|---|---|
| Temperature, °C | 400 | 400 |
| Pressure, lbs./sq. in. | 2160 | 2200 |
| Yield: | | |
| Total liquid product, per cent | 45.4 | 77.5 |
| Crude dimer (95–128° C.), per cent | 18.7 | 29.9 |
| Cyclic dimer, per cent | 11.2 | 20.6 |

Table III.—Continued

Liquid product:
 Crude dimer (95–128° C.), per cent _____ 41.3  38.6
 Cyclic dimer, per cent _____ 24.8  26.6
Per cent cyclic dimer in crude dimer __ 60.0  69.0

EXAMPLE IV

A run similar to those of Example I was carried out in the presence of added nitrogen, with the following conditions and results:

Table IV

Isobutylene charged, grams _____ 265
Nitrogen charged, lbs./sq. in. at 25° C ____ [1] 1050
Time, hours _____ 1.0
Temperature, °C _____ 430–440
Pressure, lbs./sq. in _____ [2] 4700
Yield:
 Total liquid product, per cent _____ 69.1
 Crude dimer (95–128° C.), per cent _____ 31.0
 Cyclic dimer, per cent _____ 23.0
Liquid product:
 Crude dimer, per cent _____ 44.8
 Cyclic dimer, per cent _____ 33.2
Per cent cyclic dimer in crude dimer _____ 74.0

[1] The partial pressure of the isobutylene is about 1750 pounds per square inch.
[2] Volume of bomb 1715 cc.

In addition to nitrogen, other diluents such as steam or methane may be employed. At a given pressure, the diluent tends to decrease the number of collisions of olefin molecules, which decreases the rate of reaction and, at the same time, absorbs part of the heat of the exothermic reaction. The diluent thus constitutes a means of controlling the polymerization, which is particularly important in a continuous system using short contact times during which the rate of polymerization is very fast and considerable heat is released.

EXAMPLE V

Comparison of the following runs carried out, respectively, at 510–520° C. for 4 minutes and at 425° C. for 57.5 minutes, indicate the essential equivalence of time and temperature in the process according to the present invention:

Time, minutes _____ 4  57.5
Temperature, °C _____ 510–520  425
Pressure, lbs./sq. in _____ 500  500
Yield:
 Total liquid product, per cent _____ 28.9  28.0
 Crude dimer (95–128° C.), per cent _____ 13.9  17.2
 Cyclic dimer, per cent _____ 6.8  8.6
Liquid product:
 Crude dimer, per cent _____ 48.2  61.4
 Cyclic dimer, per cent _____ 23.5  30.7

In these two runs, which were carried out in a continuous apparatus, the pressures indicated were the operating pressures throughout the runs.

EXAMPLE VI

*Isolation of cyclic dimer from liquid product*

384 g. of weathered liquid product, obtained according to Example I and, according to analyses, containing 102.1 g. of the cyclic dimer, 1,1,3-trimethylcyclopentane, were charged into a still equipped with a 15-plate column and were fractionated to give 138.8 g. of product boiling between 100° and 110° C. at 760 mm.

This fraction was then washed three times with 83.0% sulfuric acid to effect solution or polymerization, or both, of the olefins present. An individual washing was accomplished by shaking the fraction with a two volume portion of the acid in a separator for 10 minutes and then allowing one-half hour for the phases to separate before drawing off the acid layer. The product from the acid treatment amounted to 120.9 g., after alkali and water washing and drying with calcium chloride. The product from the acid treatment was then distilled through an efficient fractionation column (90-plate) using a reflux ratio of 50:1 to obtain a 91.6 g. fraction boiling between 104.7 and 105.3° C. at 760 mm. Most of this product distilled at 105.0° C. and it consisted substantially of the cyclic dimer. The properties of this product are shown below in comparison with the corresponding properties of 1,1,3-trimethylcyclopentane:

|  | 104.7°–105.3° C. boiling fraction | 1,1,3-trimethylcyclopentane |
|---|---|---|
| B. P./760 mm | 105.0° C. (average) | 105.0 |
| $d_4^{20}$ | 0.7482 | 0.7481 |
| $n_D^{20}$ | 1.4110 | 1.4109 |
| Bromine No | 0.4 | 0.0 |

Another product obtained according to the method of Example IV was fractionated through a 45-plate column to obtain 100 cc. of material boiling at 105° to 105.1° C. This fraction was filtered through silica gel and refractionated through a 62-plate column. The properties of the heart cut are shown below in comparison with the theoretical properties of 1,1,3-trimethylcyclopentane and with the properties of the latter as synthesized from 1-chloro-1,3-dimethylcyclopentane according to the process described and claimed in copending application, Serial No. 570,474, filed on even date herewith and entitled "Synthesis of 1,1,3-trimethylcyclopentane."

According to the said copending application, purified 1-chloro-1,3-dimethylcyclopentane is converted into crude 1,1,3-trimethylcyclopentane by treatment with zinc dimethyl, using xylene as solvent, and also by treatment with methyl magnesium iodide in dibutyl ether. The crude reaction products, with added xylene, from both preparations are individually fractionated through a 62-plate column. Heart cuts boiling at about 105° C. are taken and purified by filtering through silica gel to free them from traces of unsaturates and added xylene.

*Comparison of 1,1,3-trimethylcyclopentane with the cyclic dimer of isobutylene*

|  | Cyclic dimer of isobutylene | Product of Grignard reaction | Zinc dimethyl reaction product | Theoretical product |
|---|---|---|---|---|
| Boiling pt., 760 mm., °C | 105.0 | 105.0 | 105.0 | |
| Sp. gr. at 20°/4° C | 0.7480 | 0.7481 | 0.7481 | |
| Refractive index, $n_D^{20}$ | 1.4108 | 1.4109 | 1.4109 | |
| Molecular weight | 113 | 113 | 112 | 112.2 |
| Viscosity at 20° C.: | | | | |
|  Centistoke | 0.828 | 0.827 | 0.827 | |
|  Centipoise | 0.619 | 0.619 | 0.619 | |
| Aniline point, °C | 59.8 | 59.7 | 59.7 | |
| Carbon, per cent | 85.82 | 85.81 | 85.55 | 85.63 |
| Hydrogen, per cent | 14.51 | 14.49 | 14.44 | 14.37 |
| Weight carbon-hydrogen ratio | 5.91:1 | 5.92:1 | 5.92:1 | 5.96:1 |
| Molecular refraction | 37.22 | 37.22 | 37.22 | 36.94 |

The agreement between the properties of 1,1,3-trimethylcyclopentane, theoretical and produced according to the aforedescribed syntheses, and those of the cyclic dimer shows that the latter is 1,1,3-trimethylcyclopentane. The amount of the cyclic dimer isolated according to the procedure of the present example was about 90 per cent of that present in the crude product.

Fractionation through an efficient column would be an alternative procedure for recovering the 1,1,3-trimethylcyclopentane. It is also possible to fractionate out a narrow boiling cut (104.5-105.5° C.) from a crude reaction product. The narrow boiling cut may be hydrogenated to convert the olefins present into saturated bodies having different boiling points than the unsaturates from which they may be derived. The hydrogenated product may then be fractionated through an efficient column to effect separation of 1,1,3-trimethylcyclopentane. Other means of reacting out contaminating olefins, such as treatment with thioglycolic acid, may also be employed.

What we claim is:

1. A method for the production of 1,1,3-trimethylcyclopentane which comprises subjecting isobutylene to a temperature within the range of 400° to 600° C. at a pressure within the range of about 300 to 5000 pounds per square inch for a time sufficient to effect substantial cyclic polymerization of the isobutylene, and separating 1,1,3-trimethylcyclopentane from the reaction products.

2. A continuous method for the production of 1,1,3-trimethylcyclopentane which comprises subjecting isobutylene to a temperature within the range of 400° to 600° C. at a pressure within the range of about 400 to 900 pounds per square inch for a time sufficient to effect substantial cyclic polymerization of the isobutylene, and separating 1,1,3-trimethylcyclopentane from the reaction products.

3. A discontinuous method for the production of 1,1,3-trimethylcyclopentane which comprises subjecting isobutylene to a temperature within the range of 400° to 600° C. at a pressure above about 1100 pounds per square inch for a time sufficient to effect substantial cyclic polymerization of the isobutylene, and separating 1,1,3-trimethylcyclopentane from the reaction products.

4. A method for the production of 1,1,3-trimethylcyclopentane which comprises subjecting isobutylene to a temperature within the range of 400° to 600° C. at a pressure within the range of about 300 to 5000 pounds per square inch in the presence of an inert diluent, for a time sufficient to effect substantial cyclic polymerization of the isobutylene, and separating 1,1,3-trimethylcyclopentane from the reaction products.

5. A method for the production of 1,1,3-trimethylcyclopentane which comprises subjecting isobutylene to a temperature within the range of 400° to 600° C. at a pressure within the range of about 300 to 5000 pounds per square inch for a time within the range of about three minutes to four hours, and separating the 1,1,3-trimethylcyclopentane from the reaction products.

6. A method for the production of 1,1,3-trimethylcyclopentane which comprises subjecting isobutylene to a temperature within the range of about 425° to 525° C. at a pressure within the range of about 300 to 5000 pounds per square inch for a time sufficient to effect substantial cyclic polymerization of the isobutylene, and separating 1,1,3-trimethylcyclopentane from the reaction products.

7. A method for the production of 1,1,3-trimethylcyclopentane which comprises subjecting isobutylene to a temperature within the range of 400 to 600° C. at a pressure within the range of about 300 to 5000 pounds per square inch for a time within the range of about 3 minutes to 4 hours, and separating the 1,1,3-trimethylcyclopentane from the reaction products by reacting out the unsaturated constituents of the reaction products and fractionally distilling the residue to recover a fraction boiling between about 104.7 and 105.3° C.

8. A method for the production of 1,1,3-trimethylcyclopentane which comprises subjecting isobutylene to a temperature within the range of 400 to 600° C. at a pressure within the range of about 300 to 5000 pounds per square inch for a time within the range of about 3 minutes to 4 hours, and separating the 1,1,3-trimethylcyclopentane from the reaction products by fractionating the reaction products to recover a fraction boiling between 100 and 110° C., reacting out the unsaturated constituents and fractionally distilling the residue to recover a fraction boiling between about 104.7 and 105.3° C.

9. A method for the production of 1,1,3-trimethylcyclopentane which comprises subjecting isobutylene to a temperature within the range of 400 to 600° C. at a pressure within the range of about 300 to 5000 pounds per square inch for a time within the range of about 3 minutes to 4 hours, and separating the 1,1,3-trimethylcyclopentane from the reaction products by fractionating said products to recover a fraction boiling between 100 and 110° C., washing said fraction with sulfuric acid to remove unsaturated products, neutralizing and drying the washed reaction products and fractionally distilling to recover a product boiling between about 104.7 and 105.3° C.

JOSEPH B. McKINLEY.
DONALD R. STEVENS.

REFERENCES CITED

The following references are of record in the file of this patent:

UNITED STATES PATENTS

| Number | Name | Date |
|---|---|---|
| 1,981,819 | Wiezevich | Nov. 20, 1934 |
| 1,987,007 | Frey | Jan. 8, 1935 |
| 1,991,354 | Plummer | Feb. 12, 1935 |
| 2,111,831 | Batchelder | Mar. 22, 1938 |
| 2,314,040 | Frey | Mar. 16, 1943 |

OTHER REFERENCES

Ipatieff "Cat. Reactions at High Press. and Temps."; 1936; pages 572-578. (Copy in Div. 31.)

Zelinskii et al. article in Jour. Russ. Phys. Soc.; vol. 45, pages 831-842; Ber. vol. 46, pages 1466-1474; C. A. vol. 7, page 3600 (1913).

Dunstan, Science of Petroleum; vol. 3; 1938; page 2027. (Copy in Div. 31.)